(12) United States Patent
Webb

(10) Patent No.: US 6,807,856 B1
(45) Date of Patent: Oct. 26, 2004

(54) VARIABLE BUOYANCY PROFILING DEVICE

(76) Inventor: Douglas C. Webb, 769 Palmer Ave., Falmouth, MA (US) 02540

(*) Notice: Subject to any disclaimer, the term of this patent is extended or adjusted under 35 U.S.C. 154(b) by 0 days.

(21) Appl. No.: 10/446,340

(22) Filed: May 28, 2003

(51) Int. Cl.$^7$ .............................. G01C 13/00; G01C 5/00
(52) U.S. Cl. ........................................................ 73/170.29
(58) Field of Search .................... 73/170.29, 170.31, 73/170.32, 170.33, 170.34, 864

(56) References Cited

U.S. PATENT DOCUMENTS

| | | | |
|---|---|---|---|
| 1,120,621 A | | 12/1914 | Lindmark |
| 1,363,958 A | | 12/1920 | Dalen |
| 3,179,962 A | | 4/1965 | Shear et al. |
| 3,228,369 A | | 1/1966 | Warhurst et al. |
| 3,257,672 A | | 6/1966 | Meyer et al. |
| 3,276,049 A | | 10/1966 | Stixrud |
| 3,301,209 A | | 1/1967 | Caldwell |
| 3,436,776 A | | 4/1969 | Davis |
| 3,471,877 A | | 10/1969 | Bayles |
| 3,641,484 A | * | 2/1972 | White et al. .................. 367/12 |
| 3,716,009 A | | 2/1973 | Strickland |
| 3,800,346 A | | 4/1974 | White |
| 3,897,742 A | | 8/1975 | Hoffman |
| 3,952,349 A | | 4/1976 | Erath et al. |
| 4,138,657 A | * | 2/1979 | Shave .......................... 367/91 |
| 4,183,316 A | | 1/1980 | Bennett |
| 4,191,049 A | | 3/1980 | Bowditch et al. |
| 4,202,034 A | | 5/1980 | Bowditch et al. |
| 4,202,036 A | | 5/1980 | Bowditch et al. |
| 4,364,325 A | | 12/1982 | Bowditch |
| 4,677,931 A | | 7/1987 | Buckle |
| 5,283,767 A | | 2/1994 | McCoy |
| 5,291,847 A | | 3/1994 | Webb |
| 5,303,552 A | | 4/1994 | Webb |
| 5,487,350 A | * | 1/1996 | Chace et al. ................. 114/330 |
| 5,869,756 A | * | 2/1999 | Doherty et al. .......... 73/170.29 |

OTHER PUBLICATIONS

R.E. Davis et al., *The Autonomous Lagrangian Circulation Explorer (ALACE)*, Journal of Atmospheric and Oceanic Technology, vol. 9, No. 3, 1992.

H.T. Rossby et al., *The Isopycnal Swallow Float—A Simple Device for Tracking Water Parcels in the Ocean*, Prog. Oceanog, vol. 14, pp. 511–525, 1985. Printed in Great Britain.

* cited by examiner

Primary Examiner—William Oen
(74) Attorney, Agent, or Firm—John P. McGonagle

(57) ABSTRACT

A compensator added to the hydraulic circuit of an ocean profiler. The compensator stores energy by compression of gas during descent and expansion of the gas during ascent, thereby reducing the work required of the active buoyancy mechanism. The pressure from the external liquid medium in which the vehicle is submerged provides the energy, a portion of which is stored within the compensator.

8 Claims, 6 Drawing Sheets

VARIABLE BUOYANCY PROFILING DEVICE

BACKGROUND OF THE INVENTION

This invention relates to oceanographic instrumentation, and more particularly to a device which cycles vertically and repeatedly between the surface and a desired depth in the ocean, i.e., profiling. Specifically, the present invention provides a means of reducing the energy expended during these profiles.

During observations of the ocean environment, it is desirable to use a vehicle able to drift freely (no physical connection to surface or bottom) and to both profile vertically and remain in equilibrium at predetermined depth.

During a descent-ascent profile, i.e., vertical ascent and descent, the properties of the surrounding water at all depths can be observed. At the ocean surface, stored data and vehicle position are reported to a shore station or ship, generally using communications via satellite. The trajectory of observed surface positions provides a measurement of ocean circulation.

It is desirable that the oceanographic vehicle and its observational payload be small and inexpensive. The vehicle should be capable of hundreds of profiles to a typical depth of 2000 meters (m) over a period of several years.

Commonly used profiler designs use an aluminum hull with an active buoyancy mechanism having a pump or displacer powered by an on-board energy supply. Examples of typical profiler devices may be seen in U.S. Pat. No. 5,283,767 (McCoy); U.S. Pat. No. 4,202,036 (Bowditch et al.); U.S. Pat. No. 4,202,034 (Bowditch et al.); and U.S. Pat. No. 4,191,049 (Bowditch et al.).

Most hulls designed to operate to 2000 m depth increase in buoyancy as their depth is increased. This characteristic facilitates finding a stable buoyancy at a fixed depth for deep drifting. When ascending, the active buoyancy mechanism must provide displacement to overcome decreasing vehicle buoyancy as it ascends. The minimal work required is the area shown to the right of the curve depicted in FIG. 2, i.e., [pressure×volume=work].

SUMMARY OF THE INVENTION

The present invention discloses an innovation which reduces the energy required to make vertical profiles, thus reducing the size and weight of the on-board battery and machinery, and increasing the performance envelope of the profiler. The present invention incorporates an entirely passive device which reduces the energy required to make vertical profiles. Specifically, the present invention adds a compensator to the hydraulic circuit of the profiler. The compensator stores energy by compression of gas during descent and releases the energy during ascent, thereby reducing the work required of the active buoyancy mechanism. The pressure from the external liquid medium in which the vehicle is submerged provides the energy, a portion of which is stored within the compensator.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be made to the accompanying drawings and descriptive matter in which there is illustrated a preferred embodiment of the invention.

DETAILED DESCRIPTION OF THE INVENTION

Figure 1:
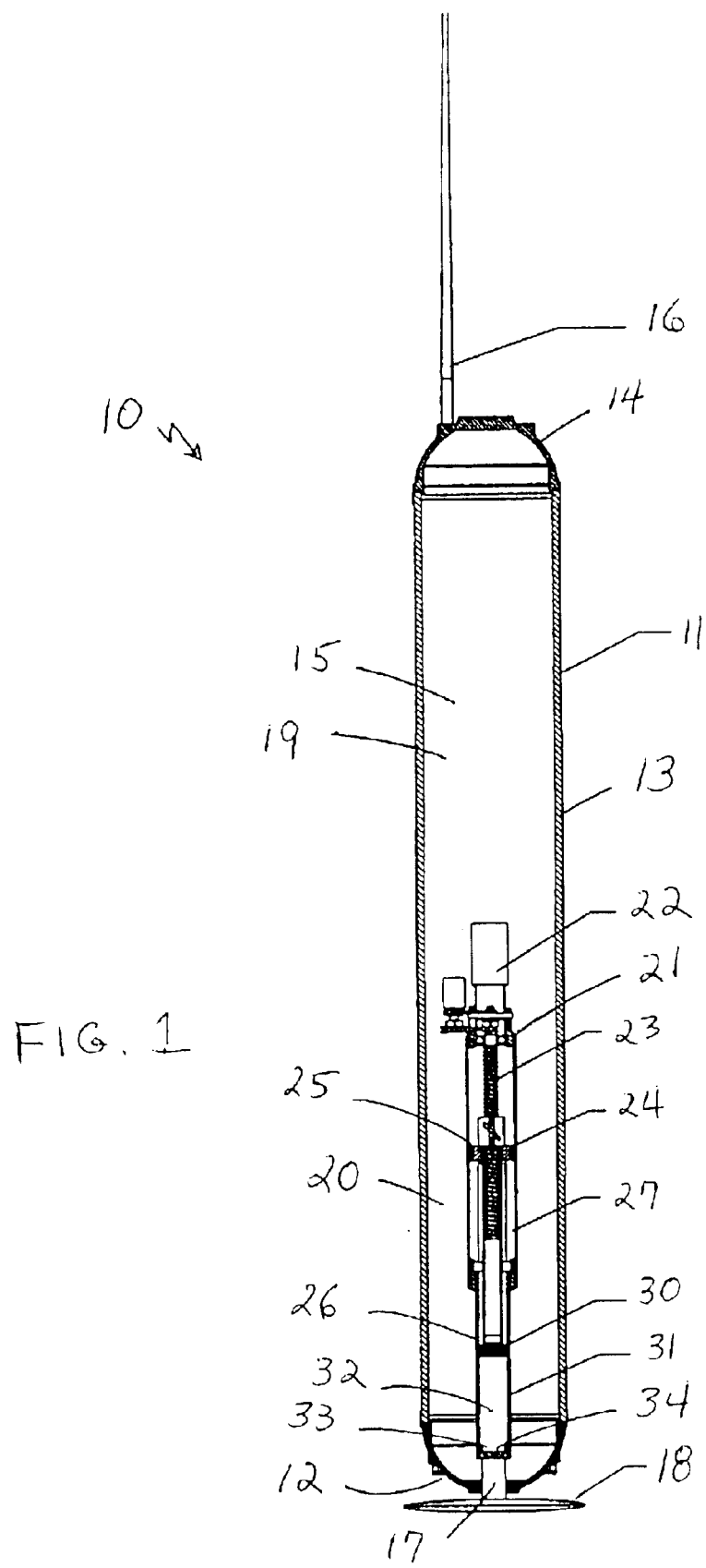
FIG. 1 illustrates a cross-section of an ocean profiler design currently in regular use today.

Referring to the drawings in detail wherein like elements are indicated by like numerals, there is shown in FIG. 1 a cross-section of a typical ocean profiler 10. This ocean profiler 10 is suitable for operation to a pressure of 200 bars (approximately 2,000 meters depth in the ocean) and typically 250 vertical profiles. The ocean profiler 10 has a pressure hull 11 having a bottom 12 from which a cylindrical side wall 13 extends vertically upward terminating in a top 14, said pressure hull 11 being generally cylindrical in shape, said top 14 and bottom 12 defining a pressure hull longitudinal axis. The top 14, bottom 12 and side wall 13 define a pressure hull interior 15. The pressure hull 11 is typically made from an aluminum alloy or other material having similar properties. The pressure hull top 14 has an elongated radio antenna 16 extending vertically upward from said pressure hull top 14, said antenna 16 having a longitudinal axis parallel with the longitudinal axis of the pressure hull 11. The purpose of the radio antenna 16 is to transmit ocean profiler data, such as salinity, temperature, pressure and geographical position, to a shore station. The pressure hull bottom 12 has an aperture 17 formed therein opening out into an external flexible bladder 18 attached to the pressure hull bottom 12.

The pressure hull interior 15 is comprised of an upper portion 19 and a lower portion 20. The upper portion 19 contains batteries, electronic equipment and controllers. The lower portion 20 contains the pumping system 21. The batteries, electronic equipment, controllers, and buoyancy control equipment are distributed within the pressure hull interior 15 so that the profiler 10 has a center of gravity below the profiler center of buoyancy, thereby causing the profiler 10 to maintain a vertical orientation within water.

To change the buoyancy of the profiler 10, its volume, i.e., displacement, must be changed. As displacement increases, the profiler's buoyancy B increases. See FIG. 2. The function of the pumping system 21 is to move oil to and from the external bladder 18, thereby increasing and decreasing profiler displacement. To do this the pumping system 21 is comprised of a motor 22 connected to a leadscrew 23 which is attached to the top 25 of an upper piston 24 in an upper cylinder 27. The motor 22 is powered by batteries (not shown) in the pressure hull interior upper portion 19. The upper cylinder 27 serves to guide the pistons 24 and 30. The upper piston 24 has a bottom 26 which is attached to a lower piston 30 in a lower cylinder 31. The lower cylinder 31 contains oil 32. The lower cylinder 31 has a bottom 33 with an aperture 34 formed therein, said aperture 34 being fluidly connected to said external bladder 18. As the leadscrew 23 is caused to turn by the motor 22, the leadscrew 23 in turn drives the upper piston 24 downward forcing the lower piston 30 downward thereby displacing oil 32 out of the lower cylinder 31 into the external bladder 18. This results in an increase in profiler displacement volume and therefore an increase in profiler buoyancy. The reverse process withdraws oil 32 from the bladder 18 into the lower cylinder 31 thereby decreasing profiler displacement volume and decreasing profiler buoyancy.

Figure 2:
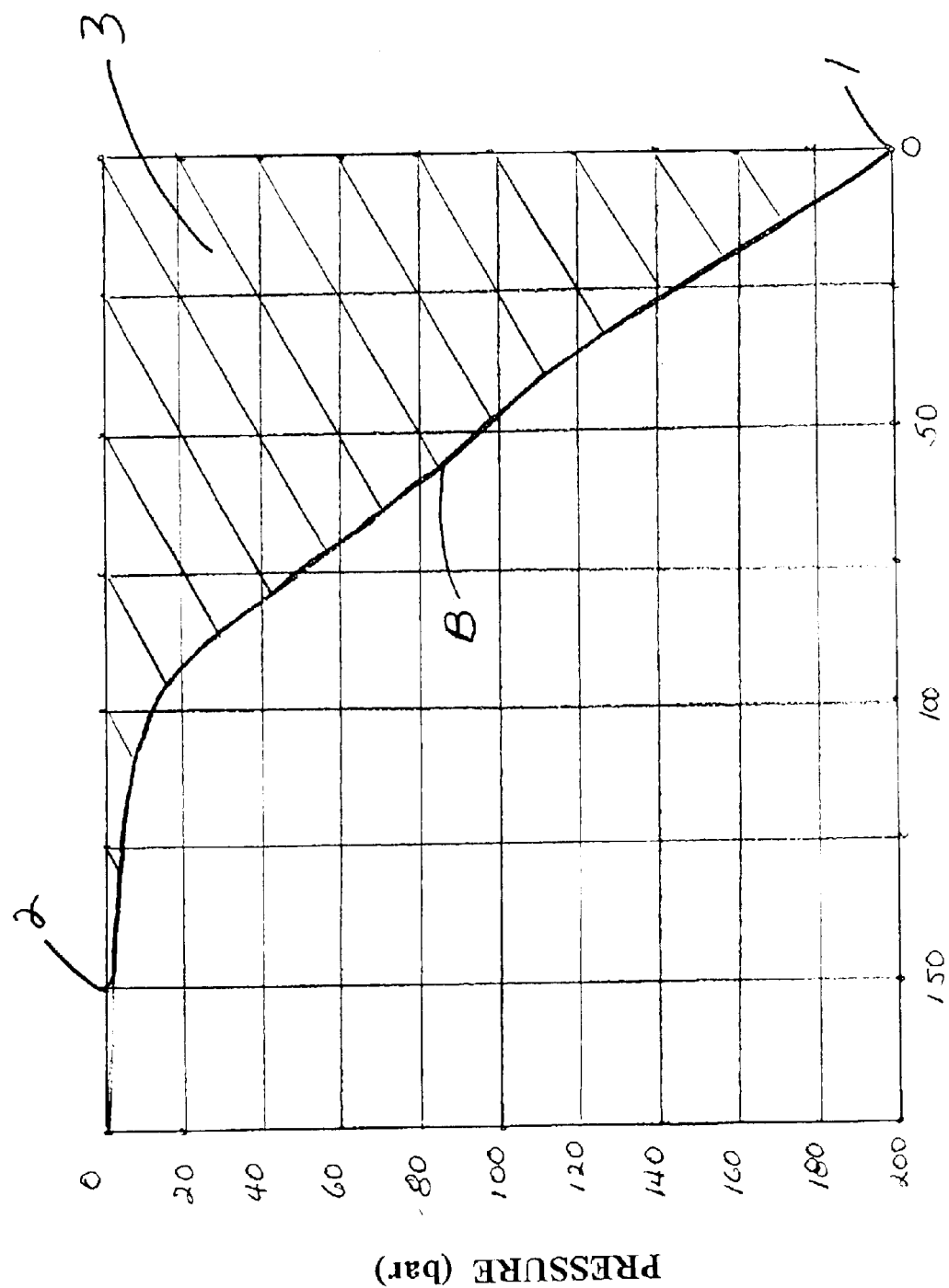
FIG. 2 illustrates graphically the change of buoyancy with pressure of a typical profiler hull operating in a typical temperate oceanic water column, wherein the buoyancy displacement volume is measured in milliliters and pressure in bars.

FIG. 2 shows the typical ocean profiler 10 in equilibrium 200 bar at 1. This means that the profiler 10 is negatively buoyant anywhere above 200 bar; is positively buoyant below 200 bar; and, therefore, is in equilibrium at 200 bars. For the profiler 10 to ascend from point 1 to point 2, i.e., profile, the profiler displacement volume must be increased. The work required to do this is indicated by the crosshatched area 3 on the graph. That is, the minimum pressure volume product that must be provided by the pumping system 21 is equal to the crosshatched area 3.

The purpose of the present invention is to reduce the work expended to profile. The present invention does this by storing energy during descent and recovering the stored energy during ascent. The improvement in profiler energy, i.e., storage of energy and reduction of energy expenditure, is the subject of this invention.

Figure 3:
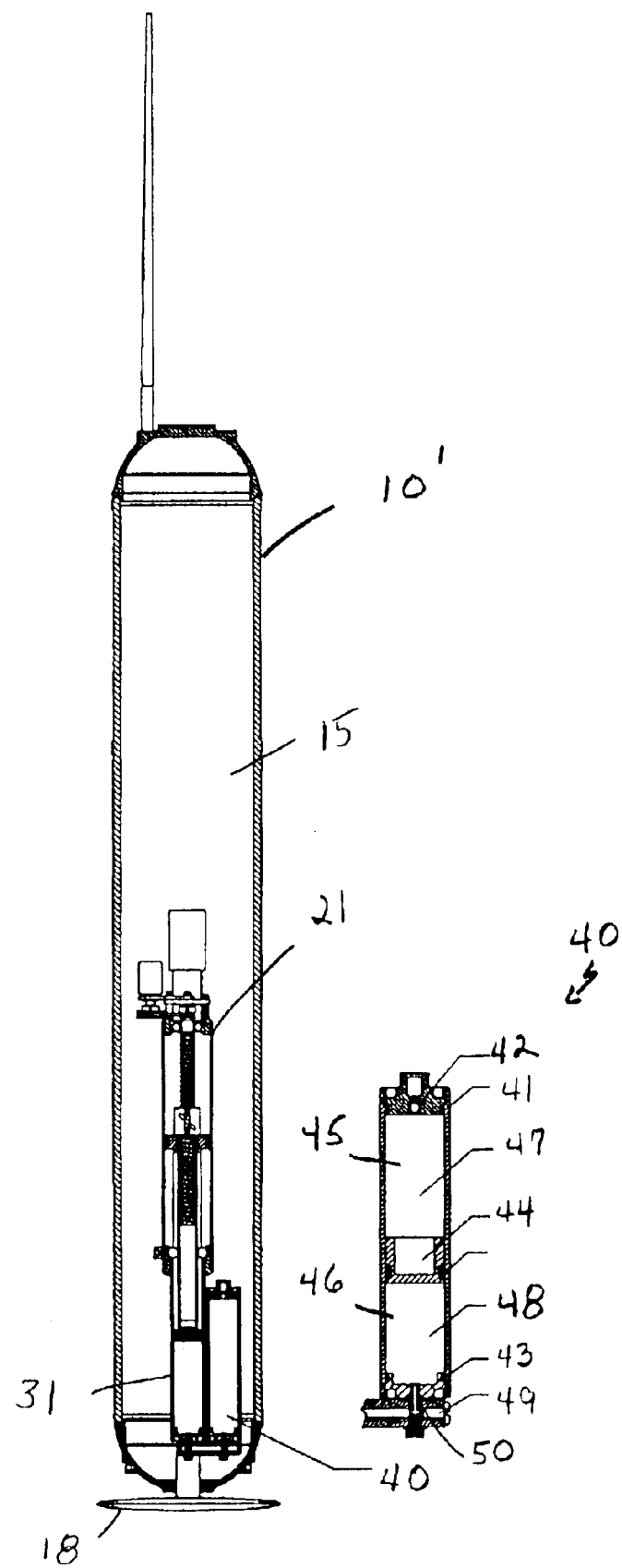
FIG. 3 illustrates the ocean profiler of FIG. 1 with the addition of the invention compensator.

Referring again to the drawings in detail wherein like elements are indicated by like numerals, there is shown in FIG. 3 the ocean profiler 10 of FIG. 1 with the addition of the invention compensator 40 resulting in an energy-improved profiler 10'. The compensator 40 is comprised of a compensator cylinder 41 having a top 42 and bottom 43, said compensator cylinder 41 being positioned in the pressure hull interior 15 parallel to the lower cylinder 31. The compensator cylinder 41 has a floating piston 44 separating gas 45 under pressure from oil 46, said gas 45 being contained in a compensator cylinder upper portion 47 defined by the floating piston 44 and the compensator cylinder top 42, said oil 46 being contained in a compensator cylinder lower portion 48 defined by the floating piston 44 and the compensator cylinder bottom 43. The compensator cylinder bottom 43 has an aperture 49 formed therein. The aperture 49 is connected by means of a tube 50 to the external bladder 18. During profiler descent the increasing ocean pressure, acting on the bladder 18 forces oil 46 into the compensator cylinder lower portion 48 forcing the floating piston 44 upward against the gas 45 in the compensator cylinder upper portion 47 thereby compressing the gas 45. During profiler ascent the gas 45 expands forcing the floating piston 44 downward forcing oil 46 out into the bladder 18 thereby increasing profiler displacement volume and increasing buoyancy. In this way, during descent energy is stored by compressing the gas in the compensator cylinder. Its energy is then available to assist in the subsequent ascent. Applicant has found that nitrogen is an excellent gas for this application. However, other suitable gases, e.g., Argon, may also be used. Although oil 32, 46 was used to illustrate the invention, other fluids, including seawater, could also be used.

Figure 4:
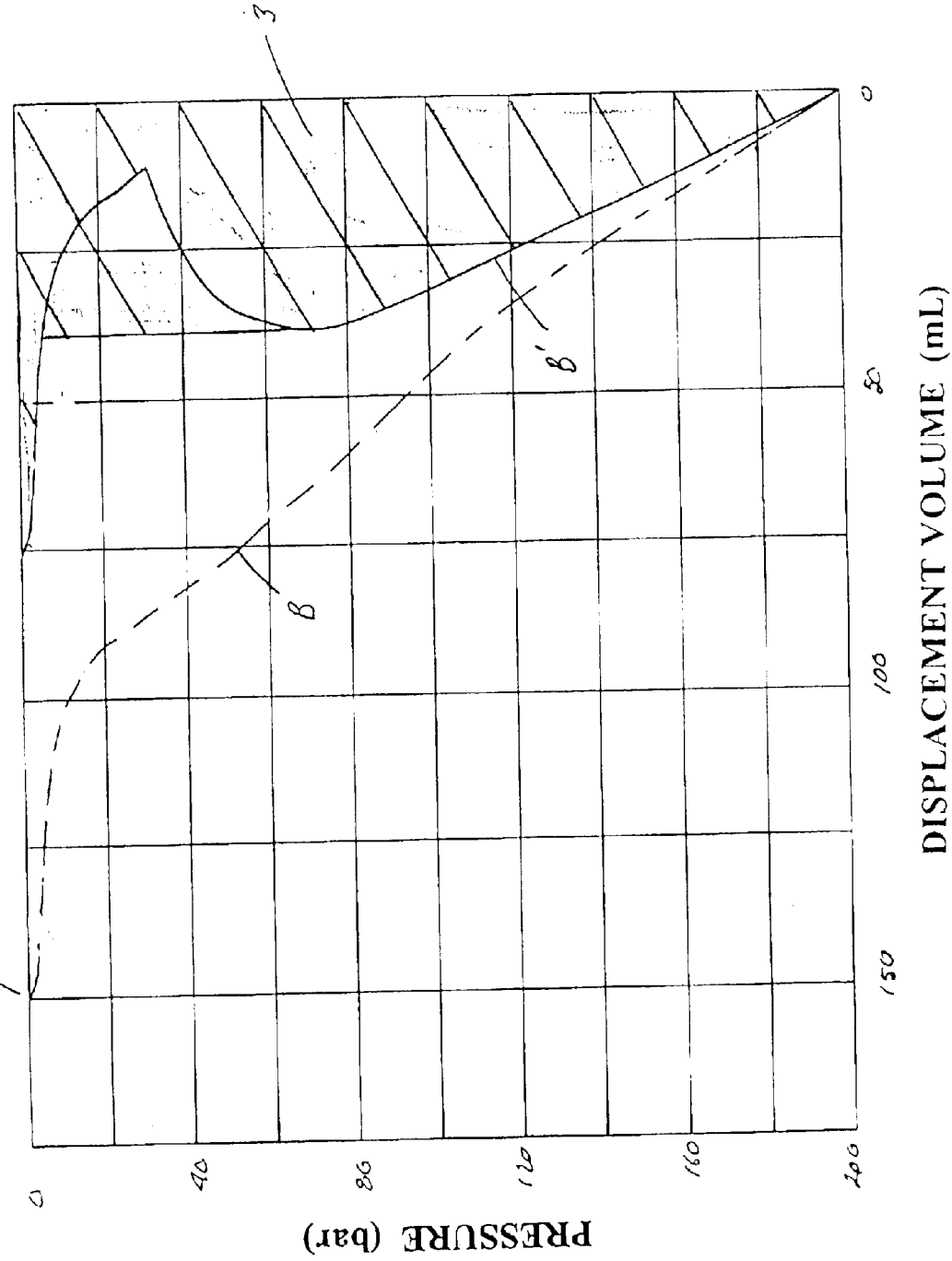
FIG. 4 illustrates graphically the effect on the buoyancy of FIG. 2 by the addition of the compensator in FIG. 3.

FIG. 4 illustrates graphically the effect on the buoyancy of FIG. 2 by the addition of the compensator in FIG. 3. The energy-improved profiler 10' is shown in equilibrium 200 bar at 1. For the profiler 10' to ascend from point 1 to point 2, i.e., profile, the profiler displacement volume must be increased. The pressure volume product, i.e., work, that must be provided by the pumping system 21 is equal to the crosshatched area 3. The dotted line B is the buoyancy curve of a typical profiler 10. The curve B' is the buoyancy curve of a profiler modified by the present invention, i.e., profiler 10'. The curve from 200 bar to approximately 30 bar is much steeper and has substantially reduced the work 3 needed for ascent. During ascent the compensator 40 is releasing energy previously stored during descent. This is pressure energy absorbed from the surrounding liquid medium during descent. At approximately 30 bar the floating piston 44 has moved downward as far as possible and is resting against the compensator cylinder bottom 43. The compensator 40 has released all of its energy. The curve B' then follows a slope exactly like the slope of curve B. The reverse is true as well. There is not sufficient pressure energy from the ocean to act on the compensator floating piston 44 until approximately 30 bar , i.e., approximately 300 meters depth.

Figure 5:
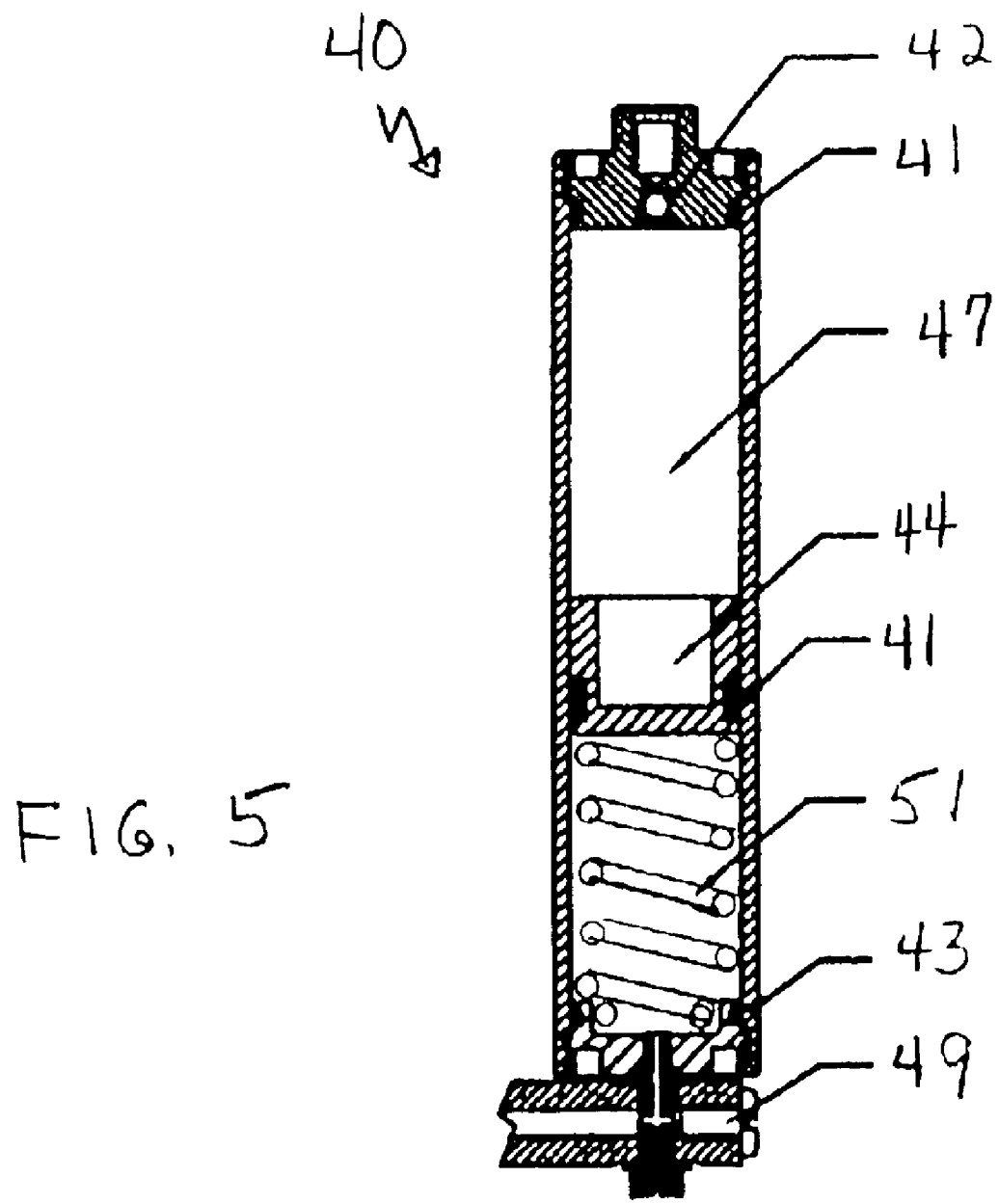
FIG. 5 illustrates the ocean profiler of FIG. 3 with the addition of a compression spring within the compensator.
Figure 6:
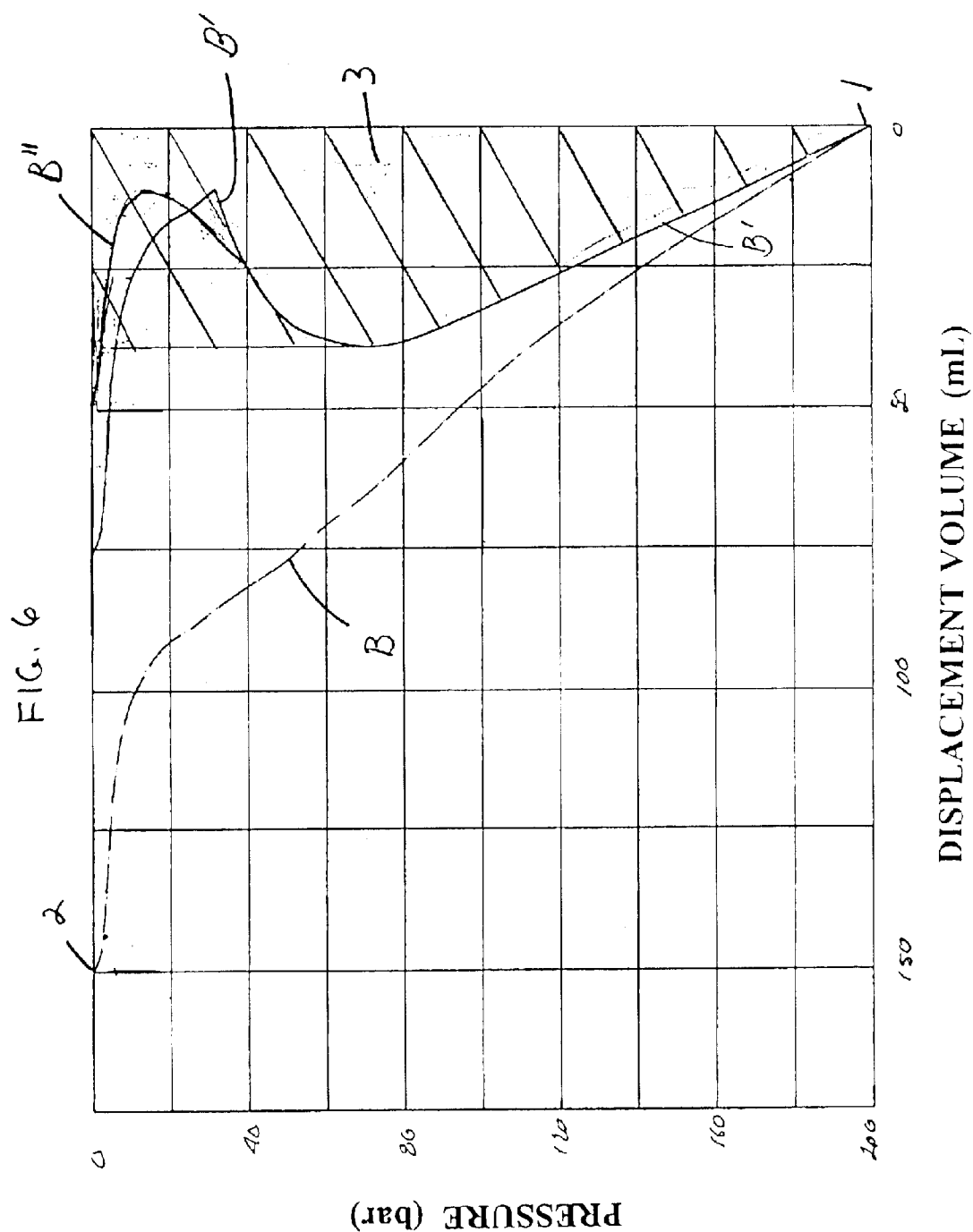
FIG. 6 illustrates graphically the effect on the buoyancy of FIG. 4 by the addition of the compensator modification in FIG. 5.

Referring to FIG. 5 another embodiment of the invention is shown. As may be seen from the graph in FIG. 4, the compensator has little effect between the surface and approximately 300 meters of depth. Non-linearities that result from gas expansion/contraction plus the floating piston 44 stopping at the end of the stroke can be moderated by adding a compression spring 51 to the compensator cylinder lower portion 48 extending from said compensator cylinder bottom 43 to said floating piston 44. This results in the floating piston 44, at the low pressure end piston stroke, being in equilibrium with the pressure of the oil 46 (external ocean hydrostatic pressure), the gas 45 and the spring compression. In addition to the gas 45 storing energy, the spring 50 is also storing some supplemental energy which is releasable during the last 300 feet of ascent, i.e., above 30 bar. FIG. 6 illustrates the effect of this in curve B" where the pressure volume area 3 has been further reduced.

Operation between the surface and equilibrium at one depth has been described, however the profiler can equilibrate at many intermediate depths. The invention application includes devices in continuous motion, e.g., profilers and underwater gliders.

The invention has been described as a way to reduce work in an oceanic profiler. The benefits accrue from improving profiler performance by decreasing the amount of energy required for a descent/ascent cycle. The work savings may be used for increasing the number of profiling cycles, reducing the size of the profiler, reducing pump size, reducing battery size or other energy sources stored aboard, reducing the cost of the profiler, etc.

It is understood that the above-described embodiments are merely illustrative of the application. The pump system 21 described above was selected as an example of what is used in selected profilers. Other pump systems, such as a single stroke piston pump, a swash plate pump, a gear pump, thermal pump, or other suitable pumping systems could also be used. Although a floating piston 44 was disclosed in the above invention description, an elastomer diaphragm or metal bellows could also be used.

In other embodiments of the invention the compensator 40 could be mounted outside of the pressure hull 11 and could also have its own bladder. Although the disclosure above described a single compensator, two or more compensators are practical. In a multiple compensator arrangement, adjustments in gas volume and pressure can adjust changes in buoyancy with depth to further reduce the pump work required. Not only is the work reduced, also the volume change required is reduced. This allows the pump to be smaller and lighter.

Other embodiments may be readily devised by those skilled in the art which will embody the principles of the invention and fall within the spirit and scope thereof.

I claim:

1. An ocean profiler adapted to descend to a plurality of depths within a body of water and adapted to ascend to a plurality of depths including a surface of said body of water, comprising:

a pressure hull having a bottom from which a side wall extends vertically upward terminating in a top, said top and bottom defining a pressure hull longitudinal axis, said top, bottom and side wall defining a pressure hull interior, said pressure hull having an aperture formed therein;

an external flexible bladder connected to said pressure hull aperture;

a sensing, control and communications apparatus contained within said pressure hull;

a pumping system contained within said pressure hull and connected to said sensing, control and communications apparatus and to said external flexible bladder, said pumping system adapted to change the depth of said pressure hull; and a compensator system contained within said pressure hull and connected to said external flexible bladder, said compensator system adapted to store energy by compression of gas during a descent of said pressure hull and adapted to release said energy during an ascent of said pressure hull.

2. An ocean profiler as recited in claim 1, wherein the compensator system is comprised of:

a compensator cylinder having a top and a bottom, said compensator cylinder being positioned in the pressure hull interior parallel to the said pumping system, said compensator cylinder having a floating piston separating a cylinder upper portion, defined by the floating piston and the compensator cylinder top, from a cylinder lower portion, defined by the floating piston and the compensator cylinder bottom, said cylinder upper portion containing a compensator gas and said cylinder lower portion containing a compensator liquid, said compensator cylinder bottom having an aperture formed therein, said aperture being connected by means of a tube to said external flexible bladder;

wherein, during profiler descent, said external flexible bladder is adapted to receive an increasing ocean pressure forcing said compensator liquid into the compensator cylinder lower portion thereby forcing the floating piston upward against the compensator gas in the compensator cylinder upper portion thereby compressing the gas; and wherein, during profiler ascent, said compensator gas is adapted to expand forcing the floating piston downward forcing the compensator oil out of the cylinder lower portion into the external flexible bladder.

3. An ocean profiler as recited in claim 2, wherein:

said pressure hull interior is comprised of an upper portion and a lower portion, said upper portion containing said sensing, control and communications apparatus, said lower portion containing the pumping system and compensator system.

4. An ocean profiler as recited in claim 3, wherein:

said pumping system is adapted to move liquid to and from the external flexible bladder, thereby increasing and decreasing profiler displacement.

5. An ocean profiler as recited in claim 4, further comprising:

a compression spring in said compensator cylinder lower portion extending from said compensator cylinder bottom to said floating piston.

6. An ocean profiler as recited in claim 5, wherein:

said compensator liquid is oil.

7. An ocean profiler as recited in claim 6, wherein:

said compensator gas is nitrogen.

8. An ocean profiler as recited in claim 7, wherein:

said pressure hull has a generally cylindrical shape.

* * * * *